(12) United States Patent
Barron et al.

(10) Patent No.: US 6,414,077 B1
(45) Date of Patent: Jul. 2, 2002

(54) MOISTURE CURABLE ACRYLIC SEALANTS

(75) Inventors: Larry R. Barron, Coppell; Brian L. Damschroder, Irving, both of TX (US)

(73) Assignee: Schnee-Morehead, Inc., Irving, TX (US)

(*) Notice: Subject to any disclaimer, the term of this patent is extended or adjusted under 35 U.S.C. 154(b) by 0 days.

(21) Appl. No.: 09/363,417

(22) Filed: Jul. 29, 1999

(51) Int. Cl.$^7$ .............................................. C08L 63/00
(52) U.S. Cl. ...................................................... 524/588
(58) Field of Search ......................................... 524/588

(56) References Cited

U.S. PATENT DOCUMENTS

| | | | |
|---|---|---|---|
| 4,043,953 A | | 8/1977 | Chang et al. .................. 260/18 |
| 4,147,685 A | | 4/1979 | Smith, Jr. .................... 260/31.2 |
| 4,177,301 A | | 12/1979 | Smith, Jr. ...................... 427/401 |
| 4,707,515 A | | 11/1987 | Gilch et al. ................... 524/506 |
| 4,818,790 A | * | 4/1989 | Ooka .......................... 525/103 |
| 5,244,950 A | * | 9/1993 | Schlarb ........................ 524/114 |
| 5,281,468 A | * | 1/1994 | Klier ........................... 428/209 |
| 5,319,044 A | * | 6/1994 | Jung ............................ 526/279 |
| 5,705,561 A | * | 1/1998 | Kozakiewicz ............... 524/730 |
| 5,994,428 A | * | 11/1999 | Lutz ............................ 523/201 |

OTHER PUBLICATIONS

American Architectural Manufacturers Association, "Voluntary Specifications and Test Methods for Sealants," 1992, 22 pages.

* cited by examiner

*Primary Examiner*—Paul R. Michl
(74) *Attorney, Agent, or Firm*—Sanford E. Warren, Jr.; Edwin S. Flores; Gardere Wynne Sewell LLP

(57) ABSTRACT

A composition and method of making an improved sealant is disclosed. The sealant is made from a base polymer material that includes one or more substantially linear vinyl, acrylate, or methacrylate monomers, a hydrolyzable silane that includes one or more substantially linear vinyl, acrylate, or methacrylate silanes to produce randomly dispersed silane functionality throughout the polymer and a second hydrolyzable mercapto silane to cap some polymer chains via a chain transfer reaction, wherein the polymer has a glass transition point lower than 10° Fahrenheit and an average molecular weight between about 40,000 and about 500,000. A sealant is made by adding a cross-linking catalyst and other additives to the polymer in such proportions to produce a sealant that cures upon exposure to atmospheric moisture.

22 Claims, No Drawings

MOISTURE CURABLE ACRYLIC SEALANTS

TECHNICAL FIELD OF THE INVENTION

The present invention relates in general to the field of moisture curable sealants, and more particularly, to a sealant that is warm-applied, provides green strength and is transformed from a thermoplastic to a non-thermoplastic sealant by curing at room temperature using ambient moisture.

BACKGROUND OF THE INVENTION

Without limiting the scope of the invention, its background is described in connection with compositions and methods for the use of a sealant that is curable using ambient moisture at room temperature, as an example.

Various sealant compositions are available that may be cured by exposure to atmospheric moisture, such as those that are based on isocyanate-terminated polyurethanes or silicone polymers. Yet another type of sealant is a so-called "hot melt adhesive". Typical hot melt adhesives set quickly due to instant cooling after application and thus provide a narrow window of time in which the position of the substrate, such as glass, may be adjusted within the frame after application. Hot melt adhesives also require high application temperatures typically in excess of 300° Fahrenheit.

Generally, the choice of sealant products has been determined by a balance between good quality seals and price. Sealants based on isocyanate-terminated polyurethanes, however, are unsuitable for long-term packaging and storage due to their short shelf life, i.e., they tend to harden in situ. Also, isocyanate based sealants suffer from the drawback of limited thermal stability.

Another problem observed with these types of polyurethane polymers is bubble formation, which results from the production of carbon dioxide during the curing process. Also, heat-resistance of the seals formed is only moderate in many cases and UV resistance through glass is poor.

Sealants based on silicone polymers, on the other hand, generally have desirable properties and yield seals of high quality that perform well under many conditions. Silicone-based systems offer both clear sealing and good ultra-violet light stability. Unfortunately, both the polyurethane hot-melts and silicone sealants typically tend to require expensive materials. Silicon sealants may not possess the desired adhesion characteristics when used in connection with some substrates, particularly in high moisture environments. Another drawback of silicon sealants is the fact that they do not provide a substrate to which a coating, such as paint or stains, will adhere. They also cause contamination problems on substrates.

Various moisture-curable compositions are known in the art. For example, U.S. Pat. No. 4,043,953, entitled "Ambient Temperature Moisture-Curable Acrylic-Silane Coating Compositions Having Improved Potlife", discloses an ambient temperature, moisture-curable coating composition that includes as one part an acrylic-silane interpolymer of an ethylene monomer and a vinylalkoxysilane. U.S. Pat. No. 4,707,515, entitled "Moisture-Curable Sealant Compositions," discloses a sealant composition capable of curing using atmospheric moisture formed from a reaction of substantially linear acrylate ester polymer with a hydrolyzable silane having an amino functional silane group. U.S. Pat. No. 4,147,685 and U.S. Pat. No. 4,177,301, entitled "Adhering Silicone Compositions," and "Primer Compositions for Adhering Silicone Compositions", respectively, disclose primer compositions that are the reaction product of methyl- or butylmethacrylate or butylacrylate and an acrylate functional silane that is moisture curable at room temperature. Wakabayashi, U.S. Pat. No. 4,910,255, entitled "Curable Composition", discloses a composition containing a copolymer that has silicon-containing functional groups capable of cross-linking by forming siloxane bonds, alkyl acrylate monomer from 1 to 8 carbons, and alkyl acrylate monomers with at least 10 carbons as a co-reactant with a silane terminated polyoxypropylene based polymer.

None of the previously mentioned patents disclose materials in which a second silane groups is used to cap some of the polymer chains. As a result of the inclusion of this second type of silane unit, the composition claimed here meets the need for a sealant with desirable physical properties not found in the prior art.

SUMMARY OF THE INVENTION

What is needed is a sealant composition curable by atmospheric moisture, that forms a resilient seal at ambient temperatures and that is manufactured with inexpensive raw materials. The sealant composition must also have a desirable combination of properties, such as, convenient application, and a long storage life. Another preferred feature of a sealant is that it provides an opportunity for re-seating the materials in case its position is not exact or an alternative position is preferred, and that is capable of curing using atmospheric moisture. The sealant must also be produced in a cost-effective manner. The sealant formulation of the current invention meets all of these criteria.

The moisture curable composition of the present invention may be warm applied or may be applied as a low viscosity solvent-containing sealant under ambient conditions. When warm applied, the present invention differs substantially from "hot melt" sealants in that the method of curing the sealant of the present invention does not depend on temperature. As distinguished from "hot melt" sealants, the sealant of the present invention for warm application is stored as a viscous semi-solid that is warmed to increase mobility. Therefore, the warm applied sealant is not melted and hardened when it cools, as is the case with "hot melt" sealants. The sealant of the present invention cures when exposed to atmospheric moisture to form a non-thermoplastic sealant, which is highly elastic and adhesive.

The warm applied sealant of the present invention cures chemically, not thermally, and is stable in the warm form as compared to conventional moisture curing hot melt sealants based on polyurethane chemistry. The sealant is produced by admixing a polymer with various additives that produce a sealant with superior green strength and curability. Unlike conventional hot melt sealants, the warm-applied sealant of the present invention allows for repositioning of substrates after application and prior to chemical curing to a non-thermoplastic rubbery sealant.

The curable, warm-applied composition of the present invention is useful for many purposes such as sealant adhesives, pressure-sensitive adhesives, water proofing agents, sealant compositions, casting rubber materials and foaming materials. Using the moisture curable composition of the present invention, the inventors have sealed windows in compliance with the AMAA's guidelines for sealants. The present composition and method for curing a sealant includes mixing the components in a relatively moisture-free condition. Once blended, the composition may be stored for a prolonged period at ambient temperature without degradation in a sealed container. The composition of the present invention cures rapidly to form a good rubber elastomer upon exposure to atmospheric moisture.

The curable composition of the present invention is used as a one-component elastomeric sealing material that displays superior weather resistance, may be transparent or pigmented and have high tensile strength and elongation. The composition of the present invention readily accepts paint, which is in contrast to silicone-based sealants, which do not. It also displays greatly improved characteristics for use as a highly elastic sealant in window creation and packaging and other areas.

The moisture curable composition of the present invention may be used as a waterproofing agent. It also exhibits a good balance between breaking strength, elongation, and glass transition temperature, while at the same time having a long storage life and improved application during manufacturing as compared to products prepared by existing techniques using more expensive components.

The curable composition of the present invention may also be used as an adhesive because it exhibits high bond strength, in particular, a good balance between peeling bond strength and shearing bond strength, and therefore holds promise for application as a bedding sealant in the formation of large and small windows.

The present invention includes a flowable sealant composition for use in window pane sealing includes a fluid polymer material that is a reaction product of a substantially linear polymerized linear vinyl, acrylate and methacrylate monomers in a free radical process having a viscosity in the range of about 1000 to 50,000 Centipoise measured at 77 degrees Fahrenheit in 70% toluene, and a glass-transition temperature ($T_g$) not greater than about 10 degrees Fahrenheit (-12.2 degrees Centigrade) with at least two hydrolyzable silanes having organo-functional group(s). The silane and linear monomers are selected and used in quantities that provide a fluid polymer. The polymer is generally homogeneous having an average molecular weight of between about 40,000 and 500,000 $M_w$.

The polymer is then formed into a sealant by the addition of a crosslinking catalyst to form a sealant that is curable by exposure to atmospheric moisture and that forms a resilient solid. Other additives, such as rheology control agents may be added to control the features of the sealant, as described herein. An important feature of the invention is the selection of reactants for the polymer and the capping of the polymer using, e.g., a mercaptan-group containing silane.

An important property of the sealant composition is the ability to be applied readily to horizontal or vertical joints, to become cured to a tough resilient condition by exposure to atmospheric moisture and also to provide a seal having good resistance to aging by UV, heat and moisture, and resilience and extensibility in the joint. Some of these properties are dependent on the selection of the substantially linear monomers used to form the polymer.

More particularly, the present invention is a composition and method of making an improved sealant used for sealing, e.g., window panes and glass doors. The polymer used as the base for the sealant may be further defined as polymer composition including one or more substantially linear vinyl, acrylate, or methacrylate monomers reacted with a first hydrolyzable silane having one or more substantially linear vinyl, acrylate, or methacrylate silanes to produce randomly dispersed silane functionality throughout the polymer chain. To this mixture is added a second hydrolyzable mercaptosilane to cap some polymer chains via a chain transfer reaction, and a polymer initiator. The resultant polymer has a glass transition point lower than 10° Fahrenheit (-12.2° C.) and an average molecular weight between about 40,000 and about 500,000. To make the sealant based on the polymer of the present invention, a cross-linking catalyst is added to the polymer to form a sealant.

Also disclosed is a method of making a polymer suitable for use as a base polymer for a sealant composition, a method for making a sealant composition incorporating the polymer and a method of applying the sealant.

DETAILED DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

The present invention contemplates compositions and methods for making a moisture curable sealant with increased green strength, adhesiveness and resiliency. The composition includes a base polymer having a glass transition point lower than 10 degrees Fahrenheit and an average molecular weight of between about 40,000 and 500,000. The polymer is initiated by the addition of a free radical generating initiator. Free radical polymer initiators are well known to those of skill in the art and are selected based on the speed, temperature, catalytic target and the like. Used as an example herein is t-butyl peroctoate, which is introduced as a polymer initiator or promoter that catalyzes the polymerization of the monomers into polymer chains.

The base polymer is then mixed with additives and an organotin catalyst to produce a moisture curable sealant that may be warm applied or applied at room temperature in solvent. The sealant of the present invention differs substantially from "hot melt" sealants in that the method of curing the sealant of the present invention does not depend on temperature. As distinguished from "hot melt" sealants (such as isocyanate moisture-curable, hot melt sealants) the warm applied sealant disclosed herein is stored as a viscous liquid that is warmed to increase its mobility, not to cause a melting and subsequent hardening of the sealant as is the case with "hot melt" sealants. Alternatively, the sealant may be include sufficient solvent to have low-viscosity at room temperature and to be applied at under ambient conditions.

The warm-applied sealant disclosed herein cures chemically, not thermally. The sealant is stable in the hot form as compared to conventional moisture curing hot melt sealants based on polyurethane chemistry, which are unstable and may not be readily reheated for further use. The sealant is produced by admixing a polymer with various additives to produce a sealant with superior green strength and curability. Unlike "hot melt" sealants, the sealant disclosed herein allows for repositioning of a combination of substrates after application and prior to curing.

The ideal window sealant possesses the following properties: adhesion strength, low temperature flexibility, resistance to weathering (i.e., resistance to UV radiation), shelf life and ease of application. In addition to these important features, a window sealant is also expected to have sufficient green strength to provide proper stability to the seal between application and complete curing.

Low temperature flexibility is a key requirement for window sealants, as windows tend to flex under wind-loading. Furthermore, as window support structures tend to expand and contract due to thermal variations and flex due to wind-loading, it is desirable for the sealant to maintain its flexibility at both low and high temperatures. The glass transition temperature ($T_g$) of a sealant is a common indicator of low temperature flexibility.

Another indicator of low temperature flexibility is described by the guidelines of the American Architectural Manufacturer's Association ("AAMA") for sealants. AAMA requires that windows undergo a low temperature flexibility test, in which a sealant is applied to an aluminum panel is cured, cooled to 7° Fahrenheit and then bent 1800 around a one inch mandrel. After bending, the specimens are examined for cracking and loss of adhesion to the aluminum panel.

Resistance to weathering is another important property for a window sealant, as many materials degrade upon extended exposure to UV radiation, becoming brittle, cracked and/or discolored. Another important feature is moisture resistance, especially for use with wooden frames and structures that are susceptible to moisture damage.

Yet another desirable property is coating adhesion. The window sealant must provide a surface that may not only be painted, but that promotes the adhesion of the material to paint. For example, it is well known in the art that silicon-based sealants generally do not provide a surface to which coatings, such as paint, will adhere.

The adhesion of a sealant to a window frame is typically evaluated in two ways. The first is a wind test, in which the glass is secured in the window frame using the sealant, the assembled window and frame are anchored in a retaining frame and the secured window is placed in a wind tunnel or similar device. Positive and negative pressure is applied to the window until the window breaks loose from the frame or fails. The second test used to evaluate the adhesion properties of a sealant to glass is the AAMA's "Peel Adhesion" test, in which the sealant is applied to an aluminum or glass panel, allowed to cure and then peeled away from the panel. The cohesive failure of the strip, in pounds-force per inch of width, is determined and evaluated.

From a manufacturing standpoint, similar features are desired from a window sealant. For example, it is desirable that a window sealant have a long shelf life, that is, the sealant may be cooled and reheated for the next use. The green strength of the sealant is important from the perspective of handling and transporting the windows after assembly. Cure time, shear strength and the rate of strength development during and immediately following the assembly are important to coordinate the throughput of units and storage space. Other physical properties that are indicative of the suitability of a window sealant for a given application are: yield strength, slump, vehicle migration, staining, racking, water resistance and penetration. The methods and quantitation of these results are outlined in the AAMA's "Voluntary Specifications and Test Methods for Sealants", relevant portions of which are incorporated herein by reference as to the methods and specifications for testing sealants.

The following are key features that are addressed by the present invention. The present invention provides for a polymer and a sealant that have both a long open time and long shelf life. Heating the sealant facilitates the delivery of the material and does not melt the composition. The heat merely reduces the viscosity of the material to a desirable level for application to a surface for mounting glass. The green strength of the sealant of the present invention is also improved over existing compositions from the perspective of handling and transporting the windows after assembly.

Furthermore, using the base polymer to make the sealant and methods of the present invention, a window sealer with improved cure time, shear strength and the rate of strength development is obtained. Other physical properties that are indicative of the suitability of a window sealant for a given application are: yield strength, slump, vehicle migration, staining, racking, water resistance and penetration.

In order to provide a cured sealant composition having desirable flexibility at temperatures to which the seals may be exposed, it is necessary to make a base polymer for use with the polymer having a glass-transition temperature ($T_g$) not greater than about 10 degrees Fahrenheit. The $T_g$ of a polymer is generally regarded as the temperature below which the polymer has reduced, and in most cases non-existent, flexibility. The "$T_g$" of a polymer is described by Flory, "Principles of Polymer Chemistry", pp 56–57 (Cornell University Press), the relevant portions of which are incorporated herein by reference. While the $T_g$ of a given polymer may be measured (e.g. by DSC measurement method), it may also be calculated as described by Fox, Bull. Am. Physics Soc., p. 153 (1956). Examples of $T_g$ of certain polymers are generally known to those of skill in the art with particular reference given by: Brandrup, J and Immergut, E. H.; Polymer Handbook (Wiley).

The molecular weight and viscosity of the polymer is another important consideration for the present invention. If the viscosity of the polymer is too low, the viscosity of the sealant composition made with the polymer base prior to curing may be too low for ease of application, that is, it must be sufficiently viscous to be applied to a window without running or dripping off the window surface during application. As a corollary, if the molecular weight of the polymer is too low, the cured polymer may not be strong enough so that it is not suitable for use as a window sealant.

Highly viscous polymers, however, may lead to use of excessive amounts of solvents or plasticisers or require a high temperature for application. Furthermore, the vicosity and polymerization rate and the features of the base polymer and the final sealant must reduce the risk of shrinkage or weakening of the cured seal. The base polymer for use in the sealant composition will have an average molecular weight ($M_w$) between 40,000 and 500,000, with a molecular weight of between about 60,000 to 100,000, having particulary useful characteristics. The molecular weight may be determined by gel permeation chromatography using, e.g., a U-Styragel with $10^5$, $10^4$, $10^3$, and 500 Angstrom columns calibrated with polystyrene standards.

It should be noted that those of skill in the art will know that the distribution of molecular weights of a polymer exists in any finite sample of polymer, and the number average molecular weight ($M_n$) reflects the number average molecular weight of the polymer molecules in the sample measured. The average molecular weight value is an important guide to various properties including, e.g., the tensile strength of the polymer.

Suitable polymers have low viscosities as determined using, e.g., a 70–80% solution in an organic solvent such as toluene or xylene at room temperature. In one embodiment, the polymer material has a viscosity in the range about 1000 to about 50,000 Centipoise as determined using an 70% solution in toluene at room temperature.

Polymer

The invention provides an improved moisture curable polymer composition that is particularly suitable for use as a window sealant. Substantially linear acrylate and methy acrylate monomers such as: lauryl methacrylate, methy acrylate, ethyl acrylate, butyl acrylate, 2-ethyl hexyl acrylate, methyl methacrylate, ethyl methacrylate, butyl methacrylate and 2-ethyl hexyl methacrylate, may be used as the major component of the polymer backbone. Alternatively, vinyl monomers such as vinyl acetate, acrylonitrile, methacrylonitrile, styrene, dioctyl fumarate, dioctyl maleate and maleic anhydride may be used as the major component of the polymer backbone.

The major component of the polymer is a mixture of one or more linear, or near linear chain acrylates. The polymer includes a polymer backbone formed from alkyl acrylates that have from 1 to 14 carbons. The flow properties of the sealant are generally dependent to some extent on the linear nature of the alkyl acrylate ester polymer used. Linear acrylate ester polymers will generally be used (e.g., ones that are soluble in methylene chloride, tetrahydrofuran, toluene, xylene and ethyl acetate). Examples of alkyl acrylates that may be used, in varying concentrations relative to each other, are: substantially linear acrylate monomers such as, methyl acrylate, ethyl acrylate, butyl acrylate and 2-ethyl hexyl acrylate. Substantially linear methylacrylate monomers may include: lauryl methacrylate, methyl methacrylate, ethyl methacrylate, butyl methacrylate octyl methacrylate and stearyl methacrylate. When using substantially linear vinyl monomers these may include: vinyl acetate, acrylonitrile, methacrylonitrile, styrene, dioctyl fumarate, dioctyl maleate and maleic anhydride. As an example, one ratio that may be used is a 27:31:10 weight to weight ratio of butyl acrylate:methylacrylate:lauryl methacrylate.

A minor amount of branching of the alkyl acrylate is acceptable provided that the flow characteristics of the polymer are not adversely influenced to a significant extent. Acrylate ester polymers, in general, tend to have good aging resistance and are comparatively inexpensive. Preferably, the polymer includes from about 27 to about 70 weight percent of alkyl acrylate components.

Silane functional groups are randomly interposed along the polymer backbone to provide for moisture curing of the polymer. The specific types of alkoxy silanes used for the present invention are important in relation to the materials present in polymer and used for the final cured sealant. Examples of organic silanes that may be used include: vinyl trimethoxysilane, vinyltriethoxysilane, vinyltris(2-methoxyethoxy)silane, 3-[tris(trimethylsiloxy)silyl]propyl methacrylate, vinyl methyldimethoxy silane, vinyl methyldiethoxy silane, vinylphenyldimethoxysilane and vinyl oximino silane. More specifically, it has been found useful to use methyl trimethoxysilane as both a moisture scavenger and crosslinking agent. Vinyl trimethoxysilane is useful for incorporation into the polymer to yield pendant silane side groups which are also capable of forming cross-links. The polymer may include from about 0.23 to about 0.8 weight percent of one or more of these silane components.

To provide for the capping of the polymer chain, and consequently increase the stability and uniformity of the polymer for use in the sealant composition, a mercapto-containing alkoxy silane is used. One example of a polymer capping alkoxy silane is mercaptopropyl trimethoxysilane. The polymer will include from about 0.15 to about 0.40 weight percent of mercaptan silanes selected to provide a terminal functional group and to help control molecular weight.

Examples of silanes that serve as the second hydrolyzable silane for the lateral formation of bonds and interactions between adjacent polymer chains include, but are not limited to, mercaptopropyl trimethoxysilane, mercaptopropyl triethoxysilane, mercaptopropyl tripropoxysilane and mercaptopropyl tributoxysilane.

Representative examples of other organic silane crosslinking/moisture scavenging agents include, but are not limited to, methyltrimethoxy silane, dimethyldimethoxysilane, trimethylmethoxysilane, methyltriethoxysilane, dimethyldiethoxysilane, methyltriethoxysilane, phenyltrimethoxysilane, diphenyldimethoxysilane, triphenylmethoxysilane, phenyltriethoxysilane, diphenyldiethoxysilane, vinyltriacetoxysilane, methyltri(dimethylamino)silane, methyltri(N,N-methylethylaminoxy)silane, methyltri(N-methyl-N-acetylamino)silane, methyltri(isopropenoxy) silane, vinyltrimethoxysilane, vinyltriethoxysilane, γ-methacryloxypropyltrimethoxysilane, γ-methacryloxypropylmethyldimethoxysilane, methyltriacetoxysilane, γ-glycidoxypropyltrimethoxysilane, γ-aminopropyltriethoxysilane, beta-(3,4-epoxycyclohexyl) ethyltrimethoxysilane, γ-aminopropyltrimethoxysilane N-(2-aminoethyl)-γ-aminopropyltrimethoxysilane, N-(2-aminoethyl-γ-aminopropylmethyldimethoxysilane, N-(2-aminoethyl)aminomethyltrimethoxysilane, dimethoxymethyl-3-pyperazinopropylsilane, 3-piperazinopropyltrimethoxysilane, N-(3-triethoxysilylpropyl)urea, N-phenyl-γ-aminopropyltrimethoxysilane and the like, although the present invention is not limited thereto. In addition, partial hydrolysis condensates of the above organic silanes may be used.

Sealant

Sealant compositions according to the present invention are flowable during the window assembly process so that a single application may be used on the window and require no curative agent other than atmospheric moisture. The sealant will generally be a mixture of a polymer base and various additives, as described hereinbelow in Example I, with a sealant cross-linking catalyst or promoter, that adds varying degrees of strength and adhesiveness to the final cured sealant (See Example II). The sealant catalyst or promoter may also be described as one or more additives that accelerate the final cross-linking of the compounded polymer base into a sealant. The sealant catalyst will generally be an organo-tin catalyst.

In use, the final sealant is: (a) provided as a viscous liquid composition having sufficient solvent to provide a sufficiently low viscosity at room temperature for application; or (b) provided as a semi-solid composition that after application at 200–250° F. provides sufficient green strength after setting of glass. If kept protected from water or moisture, the consistency of the sealant will remain the same until exposed to humid conditions. The sealant composition cures within a short time with atmospheric moisture, whether as a solvent containing viscous liquid or a warm applied semi-solid solvent version. The cured sealant forms a permanently resilient and pliable product with a $T_g$ between about −50 and 10 degrees F.

The curing rate will dependent on, e.g., the relative humidity, temperature, amount of solvent and the amount of cross-linking catalyst. A desirable cure rate for sealants curing at room temperature is about 5 mm thickness per day, which may be achieved with sealant compositions according to the invention that include a catalyst such as organo-tin compounds. Generally, the catalyst will be provided in an amount sufficient to catalyze the reaction.

Sealant compositions according to the invention include an effective amount of the sealant catalyst, and as described hereinbelow one or more additives. Additives for use in the final sealant include: water scavengers, UV blockers, fillers and rheology control agents (e.g., thixotropic agents (e.g., fumed silica) and wetting agents to enhances thixotropy (e.g., propylene glycol)). In fact, the sealant polymer may provide the major part of the sealant composition, or it may be compounded with quantities of additives according to the desired properties and use of the sealant. The sealant catalyst may be used in conjunction with fillers, solvents, plasticizers, adhesion promoters, or other additives known in the sealant art.

Sealant compositions of the present invention are typically formed in a mixing unit containing a sweep blade and a high speed disperser. The appropriate amount of the polymer prepared (as previously described) is placed in a mixer along with: the crosslinking catalyst such as an organo-tin catalyst that promotes the crosslinking process. In addition, a water scavenger agent (such as methyltrimethoxy silane); a thixotropic agent (such as fumed silica); an epoxy silane cross-linker for curing or a wetting agent (such as propylene glycol for example, that enhances thixotropy), may be added.

Sealants intended for exterior use are expected to encounter temperatures below 0 degrees centigrade. As windows may be used as interior or exterior windows, the present invention was designed and selected to form a sealant based on a polymer having a $T_g$ of between about −50 and about 10 degrees Fahrenheit.

The following examples are provided by way of illustration only, and are not to be construed in a limiting sense.

EXAMPLE I

Base Polymers

Depending on the viscosity, flowability, elasticity and transparency of the sealant desired, the amount and type of: base polymer, solvents, and other ingredients may be varied to achieve the desired features for the final sealant made from the base polymer. The base polymer is one of the components of the final sealant. Four examples of base polymers are described hereinbelow, however, those of skill in the art will recognize that the concentrations, components and additives provided will change the features of the final sealant using the base polymer. The solvents, polymer monomers and the cross-linking and end capping silanes may be varied to increase or decrease, for example, the average molecular weight of the base polymer. Likewise, the catalyst and moisture scavenger may be varied, depending on the amount of tolerable moisture and rate of polymer formation required.

The base polymers were made using the following protocol. All of the components except the catalyst, t-Butyl peroctoate in these examples, were mixed in a jacketed reactor in the indicated proportions, with some of the toluene reserved. The t-Butyl peroctoate was placed in a second vessel and mixed with the reserved toluene. The solutions from these two vessels were pumped into a third jacketed vessel at a controlled rate so as to maintain the reaction at the reflux temperature of toluene to produce polymers A, B, C and D. The resulting base polymers were used to prepare the sealants described hereinbelow.

TABLE I

Base Polymer Compositions

| Polymer | A | B | C | D |
|---|---|---|---|---|
| Butyl Acrylate | 27.50% | 27.25% | 27.36% | 34.55% |
| Methyl Acrylate | 30.90 | 30.58 | 30.70 | 23.03 |
| Lauryl Methacrylate | 10.00 | 9.87 | 9.91 | 9.83 |
| Trimethylolpropane Trimethacrylate | 0.16 | 0.16 | | |
| Methyltrimethoxysilane | 0.24 | 0.24 | 0.24 | 0.23 |
| Vinyltrimethoxysilane | 0.29 | 0.28 | 0.29 | 0.28 |
| g-mercaptopropyltrimethoxysilane | 0.14 | 0.14 | 0.29 | 0.28 |
| Acrylonitrile | | 0.95 | 0.87 | 0.80 |
| t-Butyl Peroctoate | 0.16 | 0.16 | 0.24 | 0.24 |
| Toluene | 30.61 | 30.37 | 30.10 | 30.76 |

Note:
All values listed are in percent
Polymer A: Molecular Weight = 165,000
Polymer B: Molecular Weight = 185,000
Polymer C: Molecular Weight = 87,000
Polymer D: Molecular Weight = 85,000 (Approximately)

The above formulations are examples of base polymer composition having an alkyl acrylate backbone with silane functional groups, i.e., trimethoxysilane groups that are pendant on the main polymer chain. The methyl trimethoxysilane functions as a moisture scavenger for stability. The acrylonitrile (2-propenenitrile), for example, provides the final sealant based on these base polymers with increased toughness and strength. The mercaptopropyl trimethoxysilane provides a silane functional group on some of the terminal ends of the polymer chains, further providing sites for cross-linking and chain extension. After reaction, the polymer solution is isolated.

EXAMPLE II

Specific Examples of Sealant Formulations

The base polymers described in the previous section were formulated into the sealant formulations described hereinbelow. The components were placed in a mixer containing a sweep blade and a high speed disperser until they were thoroughly mixed, each of the listed compositions produced a sealant with acceptable properties after it was cured, whether warm applied or applied at room temperature. When applied at room temperature, sufficient solvent was present to maintain a viscosity sufficiently low for application.

| Example 1 | |
|---|---|
| Polymer A | 2444 g |
| Methyltrimethoxysilane (MTMS) | 37.5 g |
| Aerosil R972 | 100.1 g |
| (3-Glycidoxypropyl) Trimethoxysilane | 10.0 g |
| Methyl Oximino Silane (MOS) | 10.0 g |
| Organotin Carboxylate | 10.0 g |
| Example 2 | |
| Polymer B | 300 g |
| Methyltrimethoxysilane (MTMS) | 4.6 g |
| Aerosil R972 | 12.0 g |
| (3-Glycidoxypropyl) Trimethoxysilane | 1.2 g |
| g-Ureidopropyltrimethoxysilane (Y-11542) | 1.2 g |
| Propylene Glycol | 1.2 g |
| Organotin Carboxylate | 1.2 g |

-continued

| Example 3 | |
|---|---|
| Polymer C | 300 g |
| Aerosil R972 | 18.0 g |
| N-2-Aminoethyl-3-Aminopropyltrimethoxysilane | 3.0 |
| Propylene Glycol | 1.2 g |
| Organotin Carboxylate | 1.2 g |
| Example 4 | |
| Polymer C | 300 g |
| Octyltriethoxysilane | 4.5 g |
| Aerosil R972 | 12.0 g |
| (3-Glycidoxypropyl) Trimethoxysilane | 3.0 g |
| Propylene Glycol | 1.5 g |
| Organotin Carboxylate | 1.5 g |
| Example 5 | |
| Polymer C | 300 g |
| Methyltrimethoxysilane | 4.6 g |
| Aerosil 200 | 12.0 g |
| (3-Glycidoxypropyl) Trimethoxysilane | 3.0 g |
| Propylene Glycol | 1.5 g |
| Organotin Carboxylate | 1.5 g |
| Example 6 | |
| Polymer C | 300 g |
| Methyltrimethoxysilane | 4.5 g |
| Cab-o-sil M5 | 12.0 g |
| (3-Glycidoxypropyl) Trimethoxysilane | 3.0 g |
| Propylene Glycol | 1.5 g |
| Organotin Carboxylate | 1.5 g |
| Example 7 | |
| Polymer C | 300 g |
| Methyltrimethoxysilane | 4.5 g |
| Aerosil 130 | 12.0 g |
| (3-Glycidoxypropyl) Trimethoxysilane | 3.0 g |
| Propylene Glycol | 1.5 g |
| Organotin Carboxylate | 1.5 g |
| Example 8 | |
| Polymer D | 2630 g |
| Methyltrimethoxysilane | 39.5 g |
| Aerosil R972 | 158.0 g |
| (3-Glycidoxypropyl) Trimethoxysilane | 26.0 g |
| Propylene Glycol | 13 g |
| Organotin Carboxylate | 13 g |

The final sealant composition may contain, for example, 0 to 60% finely divided fillers. Examples of fillers that may be used are calcite, limestone, mica, talc, asbestos fibers or powder, diatomaceous earth, barium sulfate, alumina, slate flour, calcium silicate, colloidal and fumed silica, magnesium carbonate, and magnesium silicate. The sealant of the invention is characterized by a combination of physical properties especially applicable to window sealant applications; however, other applications are also contemplated.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A bedding sealant composition comprising:
   (A) a polymer having a glass transition point lower than 10 degrees Fahrenheit (−12.2 degrees C.) and an average molecular weight between about 40,000 and about 500,000 produced by polymerizing
      one or more monomers of butyl acrylate, methyl acrylate, and laurel methacrylate,
      an organic silane for cross-linking and moisture removal selected from the group consisting of methyl trimethoxysilane, methyl triethoxysilane, octyl tiethoxysilane and methyl trioximinosilane,
      a hydrolyzable silane selected from the group consisting of vinyl trimethoxysilane, vinyltriethoxysilane, vinyltris(2-methoxyethoxy)silane, 3-[tris(trimethylsiloxy)silyl]propyl methacrylate, vinyl methyldimethoxy silane, vinyl methyldiethoxy silane, vinylphenyldimethoxysilane and vinyl oximino silane,
      a hydrolyzable mercaptosilane to cap some the polymer chains via a chain transfer reaction, selected from the group consisting of mercaptopropyl trimethoxysilane, mercaptopropyl triethoxysilane, mercaptopropyl tripropoxysilane and mercaptopropyl tributoxysilane,
      a free radical generating initiator, and
   (B) a cross-linking catalyst added after polymerizing the polymer in such proportions to produce a sealant that cures upon exposure to atmospheric moisture and that is highly elastic.

2. The bedding sealant composition of claim 1, wherein the cross-linking catalyst comprises an organotin catalyst.

3. The bedding sealant composition of claim 1, wherein the cross-linking catalyst comprises an organotin carboxylate catalyst.

4. The bedding sealant composition of claim 1, further comprising one or more additives that alter the green strength of the sealant.

5. The bedding sealant composition of claim 1, wherein the additive is a rheology control agent.

6. The bedding sealant composition of claim 5, wherein the additive comprises fumed silica.

7. The bedding sealant composition of claim 1, wherein the additive is a filler calcium carbonate talc, ground silica, fumed silica, carbon black and clay.

8. The bedding sealant composition of claim 1, wherein the additive is a plasticizer.

9. The bedding sealant composition of claim 1, wherein the additive is a wetting agent.

10. The bedding sealant composition of claim 1, wherein the additive is an adhesion promoter selected from the group consisting essentially of vinyl, acrylato, methacrylato, epoxy, mercapto, amino, ureido and isocyanato organo functional silanes.

11. The bedding sealant composition of claim 1, wherein the additive is a UV absorber.

12. The bedding sealant composition of claim 1, wherein the additive is an antioxidant.

13. The bedding sealant composition of claim 1, wherein the additive is a resin.

14. The bedding sealant composition of claim 1, wherein the polymer material has a number average molecular weight between about 40,000 and about 200,000.

15. The bedding sealant composition of claim 1, wherein the polymer material has a number average molecular weight between about 60,000 and about 100,000.

16. The bedding sealant composition of claim 1, wherein the polymer material has a viscosity in the range about 1000 to about 50,000 Centipoise as determined using an 70% solution in toluene at room temperature.

17. The bedding sealant composition of claim 1, wherein the free radical generating initiator is selected from the group consisting of azo catalysts, peroxide catalysts and hydroperoxide catalysts which have a 1.0 hour half life between 70° C. and 150° C.

18. A method for making a bedding sealant composition comprising the steps of:

producing a polymer having a glass transition point lower than 10° Fahrenheit (−12.2° C.) and an average molecular weight between about 40,000 and about 500,000 comprising the step of polymerizing one or more momomers of butyl acrylate, methyl acrylate, and laurel methacrylate, an organic silane for cross-linking and moisture removal selected from the group consisting of methyl trimethoxysilane, methyl triethoxysilane, octyl triethoxysilane and methyl trioximinosilane, a hydrolyzable silane selected from the group consisting of vinyl trimethoxysilane, vinyltriethoxysilane, vinyltris(2-methoxyethoxy)silane, 3-[tris(trimethylsiloxy)silyl]propyl methacrylate, vinyl methyldimethoxy silane, vinyl methyldiethoxy silane, vinylphenyldimethoxysilane and vinyl oximino silane, a hydrolyzable mercapto silane to cap some of the polymer chains via a chain transfer reaction selected from the group consisting of mercaptopropyl trimethoxysilane, mercaptopropyl triethoxysilane, mercaptopropyl tripropoxysilane and mercaptopropyl tributoxysilane, and a free radical generating initiator and adding to the polymer a cross-linking catalyst in such proportions to produce a sealant that will cure upon exposure to atmospheric moisture to produce a highly elastic sealant.

19. The method of claim 18, further comprising the step of:

removing most of the solvent to make a sealant for hot application.

20. The method of claim 19, further comprising the steps of:

heating the sealant; and applying the sealant hot.

21. The method of claim 18, wherein the bedding sealant cures as thermoplastic at the time of application, and when exposed to atmospheric moisture to produce a non-thermoplastic sealant that is highly elastic and adhesive.

22. The method of claim 18, wherein the sealant includes sufficient organic solvent to be applied at room temperature.

* * * * *